United States Patent [19]

Carleton

[11] 4,430,798

[45] Feb. 14, 1984

[54] ANGLE MEASUREMENT METHOD

[75] Inventor: Randall D. Carleton, Oklahoma City, Okla.

[73] Assignee: The Firestone Tire & Rubber Company, Akron, Ohio

[21] Appl. No.: 424,817

[22] Filed: Sep. 27, 1982

[51] Int. Cl.³ .............................................. G01B 7/00
[52] U.S. Cl. ................................ 33/1 N; 33/180 AT; 73/146
[58] Field of Search .......................... 33/1 N, 180 AT; 356/222, 238, 128, 429, 430; 324/51; 73/146, 159, 160

[56] References Cited

U.S. PATENT DOCUMENTS

| | | | |
|---|---|---|---|
| 3,717,771 | 2/1973 | Abilock et al. | 356/238 |
| 3,807,868 | 4/1974 | Simila | 356/222 |
| 3,853,408 | 12/1974 | Kaalverink | 356/238 |
| 4,095,464 | 6/1978 | Breedijk | 73/146 |
| 4,327,579 | 5/1982 | Weiss | 73/146 |
| 4,348,891 | 9/1982 | Stickler et al. | 73/146 |

FOREIGN PATENT DOCUMENTS 1773108  8/1971  Fed. Rep. of Germany ...... 356/222

*Primary Examiner*—Willis Little
*Attorney, Agent, or Firm*—Ernst H. Ruf

[57] ABSTRACT

A method for determining the bias angle of the oblique metal reinforcing elements in annular belt layers located in crown areas of pneumatic tires that includes cutting a transverse tire section and preparing the cut edges so that the individual elements are clearly defined, securing a strip of paper, co-extensive with the tread portion on the peripheral surface thereof, locating and marking radial centerlines on the cut edges and connecting same so as to form a longitudinal centerline on the paper strip; applying one probe end of an electrical conductivity meter to one end of a selected element on one of the cut edges and locating the corresponding end of this element on the other cut edge via the other probe end, drawing lines, parallel to the radial centerlines to the edges of the paper strip and connecting same with an oblique line across the noted longitudinal centerline thus permitting measuring of the bias angle therebetween.

7 Claims, 2 Drawing Figures

ANGLE MEASUREMENT METHOD

TECHNICAL FIELD

The field of art to which this invention pertains is that of measuring the bias angle of the oblique steel reinforcing elements in the annular reinforcing belt layers interposed in a crown portion of the tire between a tread portion and the tire carcass.

BACKGROUND ART

The most common prior art method of tread ply angle measurement involves cutting and buffing an about 20 cm long section of a tire tread in a manner so as to sequentially expose each of the several tread plies; scribing a longitudinal centerline thereupon and thereafter measuring a selected reinforcing element in each ply with respect to the noted centerline, with a protractor.

U.S. Pat. No. 3,807,868 to Simila relates to a method of determining the fiber orientation in paper by directing a polarized light beam at right angles to the plane of the paper, detecting the reflected light, and utilizing the values thereof to determine the fiber orientation.

Published German Patent Application DOS No. 1,773,108 to Heringhaus discloses a method for measuring a zenith or crown-angle of tires for vehicles, by utilizing manipulative steps, such as drawing a line over the tire tread as well as utilizing what appears to be a protractor to perform the actual cord measurement. It must be noted, however; that in the event of several superimposed layers, successive layers must be physically removed in order to measure each subsequent layer.

Neither of the noted references involves the use of indicator means, responsive to electrical conductivity, to determine the ends of an embedded metal reinforcing element, the drawing of the line on the surface of the tire section containing the cord and then determining the angle of the line with reference to a datum, plane or line.

DISCLOSURE OF THE INVENTION

The present invention provides a solution to the prior art problems which required actual physical removal to expose successive tread plies for measurement purposes.

The present invention pertains to a method for determining the bias angle of the oblique steel reinforcing elements in each of the several annular reinforcing belt layers in a pneumatic tire without physically removing sequential or successive portions thereof. It requires only the two cut and buffed edges and an indicator means, responsive to electrical conductivity, wherein one probe end thereof is placed on one end of a selected reinforcing element on a tread ply cut edge while keeping in mind the direction and angle of the ply being measured. The corresponding end of the selected reinforcing element is then located on the other cut edge with the second probe end, with the visual indication, that the right reinforcing element has been selected, of course being due to the completion of the circuit. Both ends of the selected reinforcing element are marked on the section and a vertical line is drawn, parallel to the vertical radial centerline on each of the cut edges, and extended to the tread surface to mark the edges of a strip of paper, adhered thereto and having a longitudinal centerline located thereon. The marked edges are then connected by an oblique line crossing the noted centerline thereby permitting measurement of the bias angle therebetween. This basic marking method is repeated for each of the plies to be measured.

Preferably the paper strip is removed from the tire section prior to the measuring step and may be placed on a larger sheet of paper to permit the lines to be extended thus simplifying measurement with a protractor.

The features and advantages of the present invention will become more readily understood by persons skilled in the art when following the best mode description in conjunction with the drawings.

BEST MODE FOR CARRYING OUT THE INVENTION

Figure 1B:
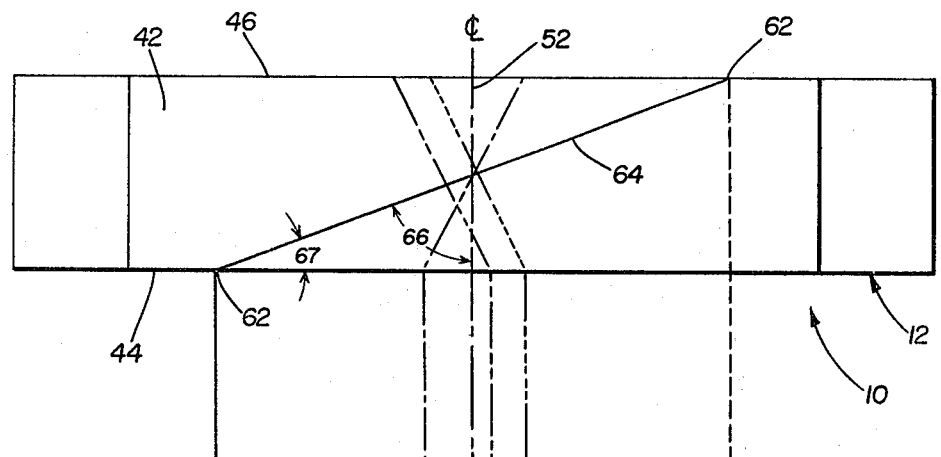
FIG. 1B is a simplified top plan view of the tire section of FIG. 1A.
Figure 1A:
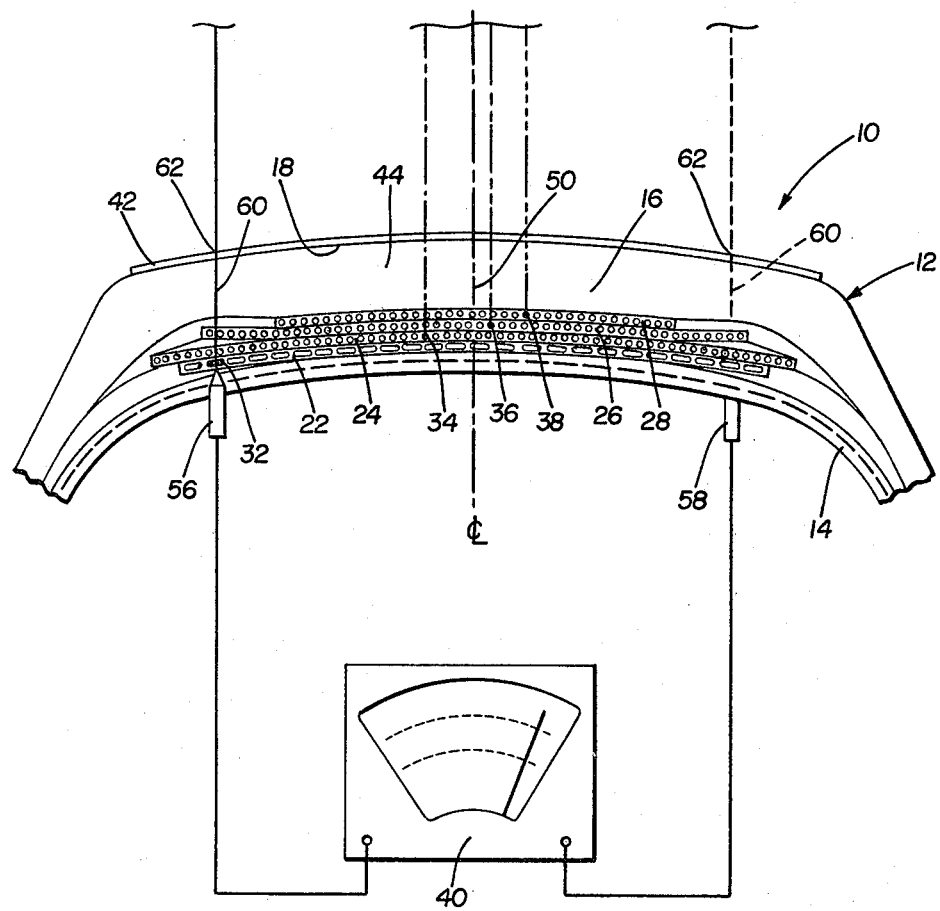
FIG. 1A is a cross-sectional view, with parts broken away for the sake of clarity, of a transverse section of a radial tire having steel reinforcing elements in a crown portion thereof, in which the angle measurement of the present invention finds utility.

Referring now to the drawings, there is shown in FIG. 1A for illustrative purposes, a transverse section 12 of a pneumatic radial tire 10 of the usual construction which generally includes a toroidal carcass 14 extending between a pair of annular bead cores (not shown) at an angle of approximately 90° relative to the circumference of the tire. A crown area of tire 10 includes a tread portion 18 and interposed therebetween and carcass 14 is generally a multi-ply reinforcing belt layer comprising first ply 22, second ply 24, third ply 26 and fourth ply 28, all counted from body ply or carcass 14 radially outwardly.

The breaker or reinforcing belt layers or plies 22, 24, 26 and 28 are layers of parallel reinforcing elements of rubberized cords or cables of a high modulus material such as steel. The pluralities of cord reinforcing elements 32, 34, 36 and 38 of the plies 22, 24, 26 and 28, respectively, are preferably oriented at a bias angle to the median equatorial plane of the tire. For example, but not limited thereto, first ply 22 may have its reinforcing elements 32 inclined at an angle of 67° to the right, whereas second ply 24 may have its reinforcing elements 34 inclined at an angle of 22° to the right, with third and fourth plies 26 and 28 having their reinforcing elements 36 and 38 inclined at 20.5° and 19.5° respectively, to the left. It should also be understood that reinforcing elements 32, 34, 36 and 38 may be of differing sizes, end counts and actual physical constructions. In addition, the various plies may be of differing lateral width.

As previously noted, the most common prior art method of tread ply angle measurement involves cutting and buffing a tire section of approximately 20 cm in length in such a manner so as to sequentially expose all four tread plies. Thereafter a longitudinal centerline is scribed thereupon and the bias angle is measured on each ply, relative to the centerline, with a protractor. The average time for this method is about 2½ hours.

The new method of tread ply angle measurement of this invention involves the use of indicator means 40, responsive to electrical conductivity, such as, for example a continuity meter such as an ohm-meter or a multimeter, or even a light-battery combination or the like; recording means 42, which preferably takes the form of a strip of paper having the same width as tire tread portion 18 and the same longitudinal extent as tire section 12; tape; a pencil and a protractor. The method for determining the bias angle of oblique steel reinforcing element 32 includes initially cutting a complete transverse section 12 from tire 10, wherein section 12 has a longitudinal extent that is sufficient to permit at least one of elements 32 to cross the longitudinal centerline of tire section 12. Thereafter, the two-cut edges 44 and 46 are prepared, preferably by buffing, so that the individual ones of reinforcing elements, 32, 34, 36 and 38 are separated and clearly defined. Then, recording means 42, preferably in a form of a strip of paper that is coextensive in length and width with tread portion 18, is secured, such as by tape, to tire section 12. Thereupon, a radial centerline 50 is located and marked on each of cut edges 44 and 46, with the radially outer ends of centerlines 50 then being connected to form a longitudinal centerline 52 on paper strip 42, with centerline 52 coinciding with the longitudinal centerline of a tire section 12.

Thereafter, one end, such as probe 56, of indicator means 40 is applied on one end of a selected steel reinforcing element 32' extending from cut edge 44. Keeping in mind the direction and angle of reinforcing elements 32 in ply 22, the corresponding other end, of reinforcing element 32', is located on cut edge 46 by means of probe other end 58. The inspector should, of course, make sure that element 32' passes through the vertical plane that includes centerline 52. It should also be understood that the application of probes 56 and 58 to the ends of selected element 32' completes the electrical circuit and will cause indicator means 40 to give visual indication thereof.

Once the circuit is completed, the cord end locations of element 32' are marked by drawing a line 60, parallel to radial centerlines 50, across each of cut section edges 44 and 46 and extending lines 60 to the surfaces of tread portion 18 thereby marking the opposing transverse edges of paper strip 42 at points 62 which are thereafter connected via oblique line 64. Thereafter, it is then possible to measure the bias angle between oblique line 64 and centerline 52. If so desired, one could also, or as an alternative, measure the complement to angle 66, namely angle 67 between oblique line 64 and a line perpendicular with centerline 52 (such as the transverse edge of paper strip 42). For ease of measurement, paper strip 42 is preferably removed from tire section 12 before the actual measurement is made. It should be evident from the previous description that the angulations of selected ones of reinforcing elements 34, 36, and 38, in plies 24, 26 and 28 respectively, are measured in a similar manner.

The method of the present invention differs from the noted prior art method in that only the cut edges of the tire section need be well buffed in order to make the desired tread ply angle measurements, whereas the prior art method requires extensive additional work in cutting and buffing the tread ply top surface in order to actually and successively expose the various tread ply reinforcing layers and reinforcing elements for measuring purposes. In addition, a normal width tire section (approximately 5 cm) long can be used instead of the usual 20 cm long section which is required for the stepdown prior art measuring process. Furthermore, while the prior art process requires about 2½ hours of labor the present measurement process takes only about 15 minutes. An additional benefit is that the paper strip used to record the various tread ply angles may be used as documentation rather than having to retain a bulky tire sample.

From the foregoing, it is believed that those familiar with the art will readily recognize and appreciate the novel concepts and features of the present invention. Obviously, while the invention has been described in relation to only a radial tire, it can also be applied to checking the angulation of the reinforcing plies or stabilizer belts in other types of tire constructions, such as belted-bias tires, for example. In addition, numerous variations, changes, substitutions and equivalents will present themselves to persons skilled in the art and may be made without necessarily departing from the scope and principles of this invention. As a result, the embodiment described herein is subject to various modifications, changes, and the like without departing from the scope and spirit of the invention, with the scope thereof being determined solely by reference to the claims appended hereto.

What is claimed is:

1. A method for determining the bias angle of the oblique steel reinforcing elements in at least one of the annular reinforcing belt layers interposed in a crown portion of a tire between the tread portion and the tire carcass, said method comprising:
   a. cutting a complete transverse section from said tire, such section being of a longitudinal extent sufficient to permit said reinforcing elements to cross the longitudinal centerline of said tire section;
   b. preparing the two cut edges so that the individual elements are clearly defined;
   c. securing means for recording on said tire section;
   d. locating and marking a radial centerline on each of said cut edges and connecting the ends of said radial centerlines, adjacent to said recording means, in a manner so as to form a longitudinal centerline, coinciding with the longitudinal centerline of said tire section, on said recording means;
   e. applying one end of an indicator means, responsive to electrical conductivity, on the end of one steel reinforcing element on one of said cut section edges;
   f. locating, via another end of said indicator means and thereby completing the circuit, the corresponding end of said one steel reinforcing element on the other end of said cut section edges, while observing that said reinforcing element crosses said longitudinal centerlines;
   g. drawing a line, parallel to said radial centerline, across each of said cut section edges, corresponding to the location of the ends of said one steel reinforcing element;
   h. marking the ends of said parallel lines, on the longitudinally opposed edges of said recording means;
   i. connecting the ends of said parallel lines across said recording means via an oblique line; and
   j. measuring the bias angle between said oblique line and the longitudinal centerline of said recording means.

2. The method of claim 1 wherein said means for recording is coextensive with the outer peripheral surface of the tread portion of said section.

3. The method of claims 1 or 2 wherein said means for recording is paper.

4. The method of claim 1 wherein said indicator means if an ohm-meter.

5. The method of claim 1 further including repeating method steps (e) through (j) for measuring the bias angle of the oblique steel reinforcing element in each additional annular reinforcing belt layer.

6. The method of claims 1 or 5 further including removing said recording means from said tire section before said measuring of the bias angle between said oblique line and said longitudinal centerline.

7. The method of claim 1 wherein in step (j), instead of measuring the bias angle between said oblique line and the longitudinal centerline of said recording means, the bias angle between said oblique line and a line perpendicular to said centerline is measured.

* * * * *